US012298400B2

United States Patent
Hu et al.

(10) Patent No.: US 12,298,400 B2
(45) Date of Patent: May 13, 2025

(54) FALSE POSITIVE OBJECT REMOVAL WITH SURFEL MAPS

(71) Applicant: Waymo LLC, Mountain View, CA (US)

(72) Inventors: Xiaoxiang Hu, Santa Clara, CA (US); Clayton Kunz, Mill Valley, CA (US); David Gallup, Bothell, WA (US); Grigory Dzhavadyan, Seattle, WA (US)

(73) Assignee: Waymo LLC, Mountain View, CA (US)

( * ) Notice: Subject to any disclaimer, the term of this patent is extended or adjusted under 35 U.S.C. 154(b) by 457 days.

(21) Appl. No.: 17/731,131

(22) Filed: Apr. 27, 2022

(65) Prior Publication Data

US 2023/0350064 A1 Nov. 2, 2023

(51) Int. Cl.
*G01S 17/89* (2020.01)
*G01S 7/48* (2006.01)
*G01S 17/18* (2020.01)
*G06T 7/521* (2017.01)

(52) U.S. Cl.
CPC ............ *G01S 17/89* (2013.01); *G01S 7/4802* (2013.01); *G01S 17/18* (2020.01); *G06T 7/521* (2017.01); *G06T 2207/10028* (2013.01); *G06T 2207/30252* (2013.01)

(58) Field of Classification Search
CPC ........ G01S 17/89; G01S 7/4802; G01S 17/18; G01S 7/003; G01S 17/931; G06T 7/521; G06T 2207/10028; G06T 2207/30252

See application file for complete search history.

(56) References Cited

PUBLICATIONS

"Jens Behley et. al., Efficient Surfel-Based SLAM using 3D Laster Range Data in Urban Environments, 2018, Robotics: Science and Systems, Institute of Geodesy and Geoinformation, University of Bonn, Germany" (Year: 2018).*

"Xiting Zhao et. al., Mapping with Reflection—Detection and Utilization of Reflection in 3D Lidar Scans, Nov. 2020, 2020 IEEE International Symposium on Safety, Security, and Rescue Robotics" (Year: 2020).*

"Lu Yin et. al., CoMask: Corresponding Mask-Based End-to-End Extrinsic Calibration of the Camera and LiDAR, Aug. 24, 2020, Remote Sens. 2020, 12" (Year: 2020).*

(Continued)

*Primary Examiner* — Andrae S Allison
*Assistant Examiner* — Phuong Hau Cai
(74) *Attorney, Agent, or Firm* — Fish & Richardson P.C.

(57) ABSTRACT

Methods, systems, and apparatus, including computer programs encoded on computer storage media, for using a surfel map to predict reflections in an environment. One of the methods includes receiving a surfel map comprising a plurality of surfels, wherein each surfel corresponds to a respective different location in an environment. Sensor data for one or more locations in the environment is obtained. The sensor data has been captured by one or more sensors of a vehicle. A range map that represents a projection of the surfel map is generated. Range data in the sensor data is compared to the range map to identify one or more locations in the range map that do not match the range data in the sensor data. The one or more locations in the range map that do not match the range data in the sensor data is classified as reflections.

20 Claims, 4 Drawing Sheets

(56) References Cited

PUBLICATIONS

"Alireza Asvadi et. al., Miltimodal Vehicle Detection: Fusing 3D-LIDAR and Color Camera Data, Nov. 2018, Pattern Recognition Letters, vol. 115, pp. 20-29" (Year: 2018).*

"Bogdan C. Matei et. al., Building segmentation for densely built urban regions using aerial LIDAR data, Jun. 2008, 2008 IEEE Conference on Computer Vision and Pattern Recognition" (Year: 2008).*

"G. Piniotics et. al., Experimental Assessment of 3D Narrow Space Mapping Technologies, 2020, the International Archies of the Photogrammetry, Remote Sensing and Spatial Information Sciences, vol. XLIII-B202020m XXIV ISPRS Congress" (Year: 2020).*

* cited by examiner

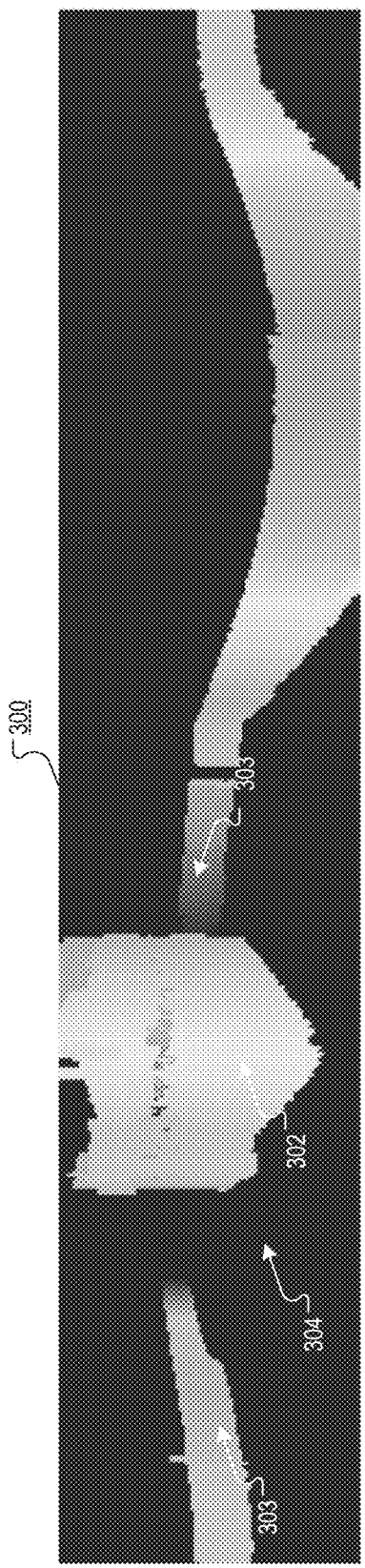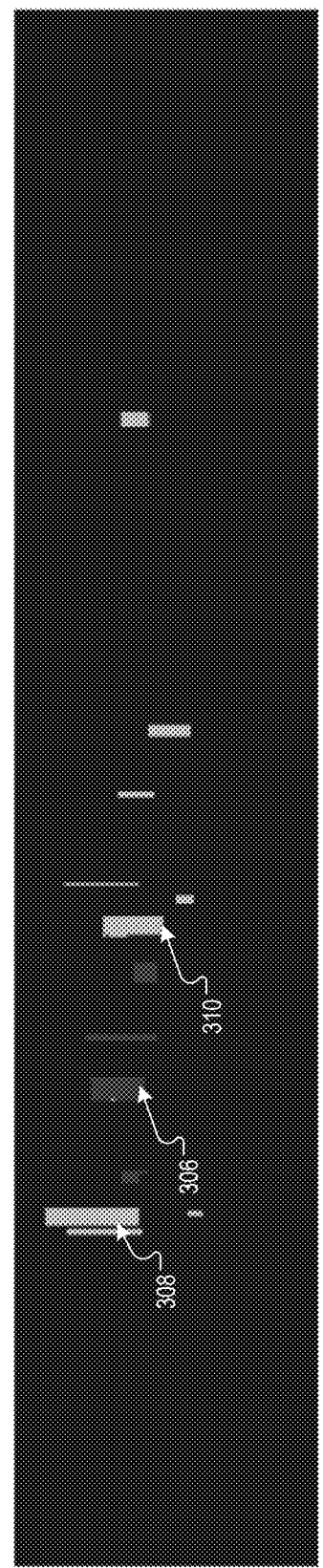
FIG. 3A
FIG. 3B

FALSE POSITIVE OBJECT REMOVAL WITH SURFEL MAPS

BACKGROUND

This specification relates to autonomous vehicles.

Autonomous vehicles include self-driving cars, boats, and aircrafts. Autonomous vehicles use a variety of on-board sensors and computer systems to detect nearby objects and use such detections to make control and navigation decisions.

Some autonomous vehicles use detection sensors, e.g., lidar systems that detect reflections of laser light, radar systems that detect reflections of radio waves, etc., to localize objects that are near the vehicles. However, reflective surfaces, e.g., windows, can generate reflections that lead to false detections, i.e., a ghost object that does not exist in the environment. For example, in an urban environment, reflective surfaces such as large windows of the buildings can bounce off laser signals and can generate laser reflections. The laser reflections can be detected as fake objects that are behind or inside the buildings.

Some laser reflections can be classified as unknown non-movable objects and the region of the road corresponding to the unknown non-movable objects can be classified as blockages, e.g., a construction zone determined by a construction zone detector. Therefore, the autonomous vehicle may change its route and may not be able to reach the region of the road corresponding to the objects caused by the laser reflections, e.g., the locations behind the buildings. If the blockages are shared across a fleet of autonomous vehicles, the region of the road may become a dead zone.

SUMMARY

This specification describes how a vehicle, e.g., an autonomous or semi-autonomous vehicle, can use a range map that represents a projection of a surfel map to remove false positive objects generated by the reflective surfaces in the environment. A system on board the vehicle can obtain the surfel map, e.g., surfel data that has been generated by one or more vehicles navigating through the environment at respective previous time points. The system can use a range map that represents a projection of the surfel map to determine windows or buildings in the environment that may have reflective surfaces. The system can use the range map to filter out false positive objects caused by reflections bouncing off the reflective surfaces.

Particular embodiments of the subject matter described in this specification can be implemented so as to realize one or more of the following advantages.

Using techniques described in this specification, an on-board system can use an off-board generated surfel map to remove false positive objects that are generated by the reflective surfaces in the environment, e.g., large windows of a building. Unlike other existing systems that rely entirely on sensor data generated by the vehicle at the current time point, e.g., laser light captured by lidar systems, using techniques described in this specification, the on-board system can effectively filter out false positive objects caused by reflections bouncing off the windows, because the system can leverage existing knowledge about the environment that the vehicle or other vehicles have gathered at previous time points, i.e., the surfel maps. Although static off road objects, such as windows or buildings, can be ignored and not detected as objects by object detectors on board the autonomous vehicle, the system can obtain a surfel map that depicts the location of the buildings. Moreover, the off-board generated surfel map can have semantic labels and the system can differentiate the buildings from dynamic objects, ground, and semi-transparent objects, such as trees and chain-linked fences. The system can generate a range image from the surfel map, and can use the range image to check if any detected objects are false positive objects, e.g., inside a building or behind a building. Thus, the system can generate more accurate environment predictions by removing the false positive objects detected in the environment. Based on the more accurate environment predictions, the planning subsystem of the autonomous or semi-autonomous vehicle can make better autonomous driving decisions, e.g., navigating through a portion of the road that corresponds to a false positive object without identifying the portion of the road as a blockage or a dead zone.

The techniques described in this specification can also reduce computational complexity and improve speed. The system can efficiently generate the range image from the surfel map and can continually update the range image while the vehicle drives in the environment using a parallel processing hardware, e.g., a graphics processing unit (GPU). Instead of loading the surfel map at each frame of the sensor data, the system can load the surfel map continually multiple times per second. For example, when processing sensor data at each frame, the system can use the surfel map generated for the previous frame while preparing the surfel map for the next frame.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3A is an illustration of an example range map of the environment of FIG. 2.

FIG. 3B is an illustration of objects detected in the environment of FIG. 2.

Like reference numbers and designations in the various drawings indicate like elements.

DETAILED DESCRIPTION

Figure 1:
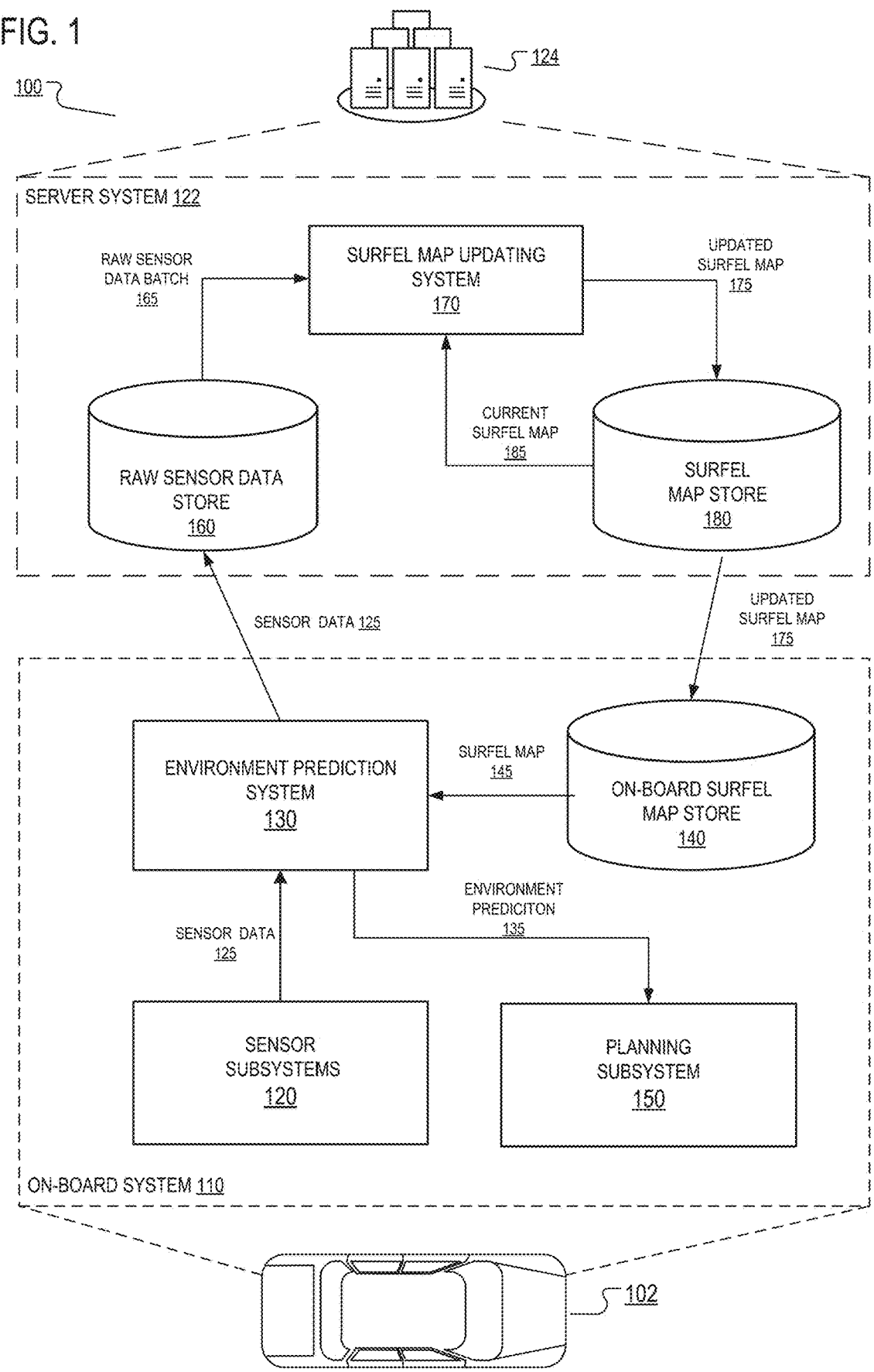
FIG. 1 is a diagram of an example system.

This specification describes how a vehicle, e.g., an autonomous or semi-autonomous vehicle, can use a surfel map to remove false positive objects caused by reflections in the environment.

In this specification, a surfel is data that represents a two-dimensional surface that corresponds to a particular three-dimensional coordinate system in an environment. A surfel includes data representing a position and an orientation of the two-dimensional surface in the three-dimensional coordinate system. The position and orientation of a surfel can be defined by a corresponding set of coordinates. For example, a surfel can be defined by spatial coordinates, e.g., (x, y, z) defining a particular position in a three-dimensional coordinate system, and orientation coordinates, e.g., (pitch, yaw, roll) defining a particular orientation of the surface at the particular position. As another example, a surfel can be defined by spatial coordinates that define the particular position in a three-dimensional coordinate system and a normal vector, e.g., a vector with a magnitude of 1, which defines the orientation of the surface at the particular position. The location of a surfel can be represented in any appropriate coordinate system. In some implementations, a system can divide the environment being modeled to include volume elements (voxels) and generate at most one surfel for each voxel in the environment that includes a detected object. In some other implementations, a system can divide the environment being modeled into voxels, where each voxel can include multiple surfels; this can allow each voxel to represent complex surfaces more accurately.

A surfel can also optionally include size and shape parameters, although often all surfels in a surfel map have the same size and shape. A surfel can have any appropriate shape. For example, a surfel can be a square, a rectangle, an ellipsoid, or a two-dimensional disc, to name just a few examples. In some implementations, different surfels in a surfel map can have different sizes, so that a surfel map can have varying levels of granularity depending on the environment described by the surfel map; e.g., large surfels can correspond to large, flat areas of the environment, while smaller surfels can represent areas of the environment that require a higher level of detail.

In this specification, a surfel map is a collection of surfels that each correspond to a respective location in the same environment. The surfels in a surfel map collectively represent the surface detections of objects in the environment. In some implementations, each surfel in a surfel map can have additional data associated with it, e.g., one or more labels describing the surface or object characterized by the surfel. As a particular example, if a surfel map represents a portion of a city block, then each surfel in the surfel map can have a semantic label identifying the object that is being partially characterized by the surfel, e.g., "ground", "building", "tree", "streetlight", "stop sign", "mailbox", etc.

A surfel map can characterize a real-world environment, e.g., a particular portion of a city block in the real world, or a simulated environment, e.g., a virtual intersection that is used to simulate autonomous driving decisions to train one or more machine learning models. As a particular example, a surfel map characterizing a real-world environment can be generated using sensor data that has been captured by sensors operating in the real-world environment, e.g., sensors on board one or more vehicles navigating through the environment. In some implementations, an environment can be partitioned into multiple three-dimensional volumes, e.g., a three-dimensional grid of cubes of equal size, and a surfel map characterizing the environment can have at most one surfel corresponding to each volume.

After the surfel map has been generated, e.g., by combining sensor data gathered by multiple vehicles across multiple trips through the real-world, one or more systems on board a vehicle can receive the generated surfel map. Then, when navigating through a location in the real world that is represented by the surfel map, the vehicle can process the surfel map along with real-time sensor measurements of the environment in order to make better driving decisions than if the vehicle were to rely on the real-time sensor measurements alone.

FIG. 1 is a diagram of an example system 100. The system 100 can include multiple vehicles, each with a respective on-board system. For simplicity, a single vehicle 102 and its on-board system 110 is depicted in FIG. 1. The system 100 also includes a server system 122 which every vehicle in the system 100 can access.

The vehicle 102 in FIG. 1 is illustrated as an automobile, but the on-board system 110 can be located on board any appropriate vehicle type. The vehicle 102 can be a fully autonomous vehicle that determines and executes fully-autonomous driving decisions in order to navigate through an environment. The vehicle 102 can also be a semi-autonomous vehicle that uses predictions to aid a human driver. For example, the vehicle 102 can autonomously apply the brakes if a prediction indicates that a human driver is about to collide with an object in the environment, e.g., an object or another vehicle detected by the on-board system 110 or represented in a surfel map.

The on-board system 110 includes one or more sensor subsystems 120. The sensor subsystems 120 include a combination of components that receive reflections of electromagnetic radiation, e.g., lidar systems that detect reflections of laser light, radar systems that detect reflections of radio waves, and camera systems that detect reflections of visible light. The sensor subsystems 120 include one or more detection sensors, e.g., one or more lidar sensors or laser sensors in lidar systems, one or more radar sensors in radar systems, etc.

The sensor data generated by a given sensor generally indicates a distance, a direction, and an intensity of reflected radiation. For example, a sensor can transmit one or more pulses of electromagnetic radiation in a particular direction and can measure the intensity of any reflections as well as the time that the reflection was received. A distance can be computed by determining how long it took between a pulse and its corresponding reflection. The sensor can continually sweep a particular space in angle, azimuth, or both. Sweeping in azimuth, for example, can allow a sensor to detect multiple objects along the same line of sight.

The sensor subsystems 120 or other components of the vehicle 102 can also classify groups of one or more raw sensor measurements from one or more sensors as being measures of an object of a particular type. A group of sensor measurements can be represented in any of a variety of ways, depending on the kinds of sensor measurements that are being captured. For example, each group of raw laser sensor measurements can be represented as a three-dimensional point cloud, with each point having an intensity and a position. In some implementations, the position is represented as a range and elevation pair. Each group of camera sensor measurements can be represented as an image patch, e.g., an RGB image patch.

Sometimes, the sensor data 125 can include reflections of laser light from reflective surfaces in the environment, such as glass, a calm body of water, or smooth metal. For example, buildings with large glass windows can generate laser reflections. The laser light can bounce off the smooth surface in a specular reflection process. The sensor subsystems 120 can classify a group of laser reflections as being measurements of an object that does not exist in the environment, e.g., a ghost object.

Once the sensor subsystems 120 classify one or more groups of raw sensor measurements as being measures of a respective object of a particular type, the sensor subsystems 120 can compile the raw sensor measurements into a set of sensor data 125, and send the sensor data 125 to an environment prediction system 130.

The on-board system 110 also includes an on-board surfel map store 140 that stores a surfel map 145 of the real-world. The surfel map 145 is an existing surfel map that has been generated by combining sensor data captured by multiple vehicles navigating through the real world.

Generally, every vehicle in the system 100 uses the same surfel map 145, e.g., a global surfel map. In some cases, different vehicles in the system 100 can use different surfel maps 145, e.g., when some vehicles have not yet obtained an updated version of the surfel map 145 from the server system 122. In some cases, different vehicles in the system 100 can use different portions of the surfel map 145 determined by the current environment of each vehicle.

Each surfel in the surfel map 145 can have associated data that encodes multiple classes of semantic information for the surfel. For example, the surfel map can have one or more labels characterizing a class prediction for the surfel. As a particular example, each surfel can have a label, indicating the type of the object characterized by the surfel, e.g., "building", "street sign", "fire hydrant", "tree", "ground", etc. Using the surfel map, the system can identify locations in the environment that correspond to objects with reflective surfaces, e.g., buildings, which might have large windows that are reflective.

The environment prediction system 130 can receive the surfel map 145 and combine it with the sensor data 125 to generate an environment prediction 135. The environment prediction 135 includes data that characterizes a prediction for the current state of the environment, including predictions for an object or surface at one or more locations in the environment. By taking consideration of the sensor data 125 collected at the current moment and the surfel map 145 previously generated by sensors on board one or more vehicles navigating through the environment, the environment prediction system 130 can generate more accurate environment prediction 135, e.g., by filtering out false positive objected detected based only on sensor data 125.

For example, the sensor data 125 can include laser lights detected by lidar sensors and the laser lights can be reflections caused by laser lights bounced off windows of a building at an intersection in the environment. Based on the laser reflections, the sensor subsystem 120 can generate a predicted object at a location that is behind the windows of the building, e.g., a reflection of the vehicle 102. The surfel map 145 can include surfels of the building in the environment. Based on the sensor data 125 and the surfel map 145, the environment prediction system 130 can compare the range of the predicted object with the range of the building. The environment prediction system 130 can determine that it is unlikely that the sensor subsystem 120 can detect an object behind the building, e.g., the sensor subsystem should not receive laser lights corresponding to a location that is behind a building. Thus, the environment prediction system 130 can determine that the object is a false detection.

As another example, the sensor data 125 can include laser lights detected by lidar sensors of the sensor subsystems 120. The sensor subsystems 120 can determine that the laser lights correspond to a pedestrian at a location in front of a building. The surfel map 145 can include surfels of the building in the environment. Based on the sensor data 125 and the surfel map 145, the environment prediction system 130 can compare the range of the pedestrian with the range of the building. The environment prediction system 130 can determine that the detected pedestrian is likely to exist in the environment because it is likely that the sensor subsystem 120 can detect an object in front of the building.

The environment prediction system 130 can provide the environment prediction 135 to a planning subsystem 150, which can use the environment prediction 135 to make autonomous driving decisions, e.g., generating a planned trajectory for the vehicle 102 through the environment. Because the environment prediction system 130 can generate more accurate environment prediction 135 for a region of interest based on the surfel map 145, the planning subsystem 150 can make better autonomous driving decisions.

For example, without the surfel map 145, the environment prediction 135 can include a false positive object located on a road behind a building that has reflective surfaces, such as large windows. A construction zone detector of the on-board system 110 may classify the false positive object as an unknown non-movable object and can create a blockage in that area corresponding to the false positive object. The planning subsystem 150 may determine a route to avoid the unexpected object in that area. Furthermore, whenever the vehicle 102 passes by the building, the on-board system 110 can generate the same false positive object on the road behind the building, and therefore, the road behind the building can become a dead zone that the vehicle 102 can never reach. With the surfel map 145, the environment prediction 135 can filter out the false positive object. Thus, the planning subsystem 150 can determine a route to the road behind the building. The road behind the building is not a blockage or a dead zone.

The environment prediction system 130 can also provide the sensor data 125 to a raw sensor data store 160 located in the server system 122. The server system 122 is typically hosted within a data center 124, which can be a distributed computing system having hundreds or thousands of computers in one or more locations. In some implementations, because the computation of the surfel map is processed by the server system 122 that is less sensitive to latency, instead of by an on-board system of a vehicle, the server system 122 can use more computationally expensive models and methods to compute and update the surfel map.

The server system 122 includes a sensor data store 160 that stores raw sensor data generated by respective vehicles navigating through the real world. As each vehicle captures new sensor data characterizing locations in the real world, each vehicle can provide the sensor data to the server system 122. The server system 122 can then use the sensor data to update the surfel map that every vehicle in the system 100 uses. That is, when a particular vehicle discovers that the real world has changed in some way, e.g., construction has started at a particular intersection or a street sign has been taken down, the vehicle can provide sensor data to the server system 122 so that the rest of the vehicles in the system 100 can be informed of the change.

The server system 122 also includes a surfel map store 180 that maintains the current version of the surfel map 185. A surfel map updating system 170, also hosted in the server system 122, can obtain the current surfel map 185 and a batch of raw sensor data 165 from the raw sensor data store 160 in order to generate an updated surfel map 175. In some implementations, the surfel map updating system 170 updates the surfel map at regular time intervals, e.g., once per hour or once per day, obtaining a batch of all of the raw sensor data 165 that has been added to the raw sensor data store 160 since the last update. In some other implementations, the surfel map updating system 170 updates the surfel map whenever a new raw sensor data 125 is received by the raw sensor data store 160.

In some implementations, the surfel map updating system 170 generates the updated surfel map 175 in a probabilistic way. In some such implementations, for each measurement in the batch of raw sensor data 165, the surfel map updating system 170 can determine a surfel in the current surfel map 185 corresponding to the location in the environment of the measurement, and combine the measurement with the determined surfel. For example, the surfel map updating system 170 can use a Bayesian model to update the associated data of a surfel using a new measurement, treating the associated data of the surfel in the current surfel map 185 as a prior distribution. The surfel map updating system 170 can then update the prior using the measurement to generate posterior distribution for the corresponding location. This posterior distribution is then included in the associated data of the corresponding surfel in the updated surfel map 175.

In some implementations, if there is not currently a surfel at the location of a new measurement, then the surfel map updating system 170 can generate a new surfel according to the measurement. In some implementations, the surfel map updating system 170 can also update each surfel in the current surfel map 185 that did not have a corresponding new measurement in the batch of raw sensor data 165 to reflect a lower certainty that an object is at the location corresponding to the surfel. In some cases, e.g., if the batch of raw sensor data 165 indicates a high confidence that there is not an object at the corresponding location, the surfel map updating system 170 can remove the surfel from the updated surfel map 175 altogether. In some other cases, e.g., when the current surfel map 185 has a high confidence that the object characterized by the surfel is permanent and therefore that the lack of a measurement of the object in the batch of raw sensor data 165 might be an error, the surfel map updating system 170 might keep the surfel in the updated surfel map 175 but decrease the confidence of the updated surfel map 175 that an object is at the corresponding location.

After generating the updated surfel map 175, the surfel map updating system 170 can store it in the surfel map store 180, replacing the stale surfel map 185. Each vehicle in the system 100 can then obtain the updated surfel map 175 from the server system 122, e.g., through a wired or wireless connection, replacing the stale version with the retrieved updated surfel map 175 in the on-board surfel map store 140. In some implementations, each vehicle in the system 100 retrieves an updated surfel map 175 whenever the surfel map is updated and the vehicle is connected to the server system 122 through a wired or wireless connection. In some other implementations, each vehicle in the system 100 retrieves the most recently updated surfel map 175 at regular time intervals, e.g., once per day or once per hour.

Figure 2:
FIG. 2 is an illustration of an example environment.

FIG. 2 is an illustration of an example environment 200. The environment 200 is depicted from a top view, e.g., looking at the environment from directly above. The environment 200 includes a vehicle 202, a building 204, an entrance to a circular road surrounding the building 204, and walls 205 and vegetation that divide the area from the outside streets. The vehicle 202 is navigating near a building 204 on the road that circles around the building 204. The vehicle 202 can be an autonomous or semi-autonomous vehicle. For example, the vehicle 202 can be the vehicle 102 that has an on-board system 110 as depicted in FIG. 1.

The sensor subsystem on board the vehicle 202 can obtain sensor data for one or more locations in the environment, and the sensor data can be captured by one or more sensors of the vehicle 202. The sensor data can include laser lights detected by a sensor, i.e., a point cloud. A point cloud is a collection of three-dimensional points that measure three-dimensional information of the environment. Each point in the point cloud can represent a distance from a lidar sensor to an object's external surface. For example, the sensor subsystem on board the vehicle 202 can detect returns of laser light generated by a lidar system of the vehicle 202. The returns of the laser light can include the laser light 210, 206, 214, and so on.

Some returns of the laser light can be returns of laser light when the beam of the light reflects off a rough surface. For example, the vehicle 202 can receive laser light 210 reflected from a tree 212, and can receive laser light 214 reflected from a trash can 216. The on-board system of the vehicle 202 can detect objects in the environment based on the sensor data. For example, based on sensor data corresponding to the laser light 210 and 214, the on-board system of the vehicle 202 can generate object detections that correspond to the tree 212 and the trash can 216 in the environment 200.

Some returns of the laser light can be reflections, e.g., specular reflections, that happens when the beam of light bounces off a smooth surface. The building 204 can have a reflective surface in the exterior of the building 204. For example, the building 204 can have glass windows. The windows of the building 204 can generate laser reflections. For example, laser light 206 can be a reflection that bounces off the window of the building 204. The laser light 206 can have a direction that is the same as a laser light returned from an object behind the building. The on-board system of the vehicle 202 can generate false positive objects that do not exist in the environment based on the sensor data that corresponds to reflections off a smooth surface. For example, based on sensor data corresponding to the laser light 206, the on-board system of the vehicle 202 can determine that an object 208 exists in the environment 200. Thus, the on-board system of the vehicle 202 can detect a false positive object that does not exist in the environment.

In some implementations, the on-board system of the vehicle 202 can generate a predicted location for each object detected in the environment 200. For example, the on-board system can generate a bounding box indicating the location of a detected object, e.g., a rectangle that surrounds the object. As another example, the on-board system can generate a semantic mask indicating the location of the detected object. In some implementations, the on-board system of the vehicle 202 can generate a class prediction for each object detected in the environment 200. For example, the on-board system can determine that the detected object 212 is likely a tree, and the detected object 216 is likely a trash can, and the detected object 208 is likely a vehicle. Sometimes, only a small amount of laser reflection that bounces off the window of the building 204 can be detected, and the on-board system of the vehicle 202 can determine that the detected object 208 is an unknown object.

The on-board system can send the object detections to a planning subsystem of the vehicle 202. The vehicle 202 can generate an updated route that avoids the objects detected in the environment. For example, the vehicle can be initially traveling in a clockwise direction around the building 204. The planning subsystem of the vehicle 202 may generate an updated route to avoid the object 208 when the on-board system determines that the object 208 is an unknown non-movable object. Thus, the vehicle may determine to turn around and travel in a counter-clockwise direction. However, similar false detections can occur when the vehicle 202 navigates near other windows of the building 204. Thus, the vehicle 202 may keep turning around and can be trapped in the environment 200.

The on-board system of the vehicle 202 can receive a surfel map of the environment 200. The surfel map can include a plurality of surfels, and each surfel can correspond to a respective different location in the environment 202. For example, the surfel map can include surfels of the building 204, the tree 212, the trash can 216, and the road surrounding the building. The on-board system of the vehicle 202 can generate a range map that represents a projection of the surfel map of the environment. The range map can include depth information or range information of the objects in the environment 200.

FIG. 3A is an illustration of an example range map 300 of the environment 200 of FIG. 2. The range map 300 can be a two dimensional image representing range data across a plurality of directions, e.g., 360 degrees, viewed from the perspective of a point on the vehicle 202, e.g., a laser sensor on the vehicle 202. Each column of the image can represent the range data at a different angle. Each row of the image can represent the range data at a different elevation.

Each pixel in the range map 300 in FIG. 3A can represent a distance measured from a point on the surface of an object to a point on the vehicle 202. The grayscale values of the pixels in the range map 300 can represent different values of the distances. Some range data can have smaller values because the surfaces of the corresponding objects can be closer to the vehicle 202, e.g., the range data 302 that corresponds to a point on the surface of the building 204 that faces the vehicle 202. Some range data can have larger values because the surfaces of the corresponding objects can be further away from the vehicle 202, e.g., the range data 303 that corresponds to a point on the tree 212.

For example, the value of the pixel 302 of the range map 300 can be the range data for a location on the exterior of the building 204 that faces the vehicle. The range data at the pixel 302 can be obtained from a corresponding surfel of the building in the surfel map. For example, the range data indicated by the value of the pixel 302 can be a distance from the surface of the building 204 at a location corresponding to pixel 302 to a lidar sensor. For example, the range data indicated by the value of the pixel 302 can be 10 meters. The horizontal long band 303 in the range map 300 can correspond to the walls 205 and the vegetation that divide the area from the outside streets. As shown in FIG. 2, the range map for the walls and the vegetation is partially blocked by the range map for the building because the building 204 is in front of a portion of the walls and vegetation. The dark area 304 corresponds to the background, e.g., the sky and the ground.

FIG. 3B is an illustration of objects detected in the environment of FIG. 2 by the on-board system of the vehicle 202. The system can obtain a location of an object captured in the sensor data. For example, the location of the detected object can include a bounding box of the object. One or more points in the bounding box can correspond to range data of the object.

The system can project the object bounding boxes of the detected objects onto the range map 300. FIG. 3B is an illustration of the object bounding boxes that have been projected on the range map 300. After projection, each object detection can be represented by a bounding box. For example, the bounding box 308 can represent a predicted object that corresponds to the trash can 216. The bounding box 310 can represent a predicted object that corresponds to the tree 212. The bounding box 306 can represent a predicted object 208 that is caused by the laser reflections 206 bounced off the windows of the building 204.

The on-board system of the vehicle 202 can compare range data in the sensor data to the range map to identify one or more locations in the range map that do not match the range data in the sensor data. The system can classify one or more locations in the range map that do not match the range data in the sensor data as reflections. The system can classify one or more locations in the range map that match the range data in the sensor data as non-reflections.

In some implementations, the system can obtain range data in the sensor data that corresponds to one or more object bounding boxes predicted by an object detector. For each object bounding box, the system can compute a percentage of the pixels in the object bounding box where the difference between the range data of the pixel in the sensor data and the range data of the pixel in the surfel map is larger than a first threshold, e.g., a distance of 25 meters. The system can compare the percentage with a second threshold, e.g., a percentage of 50%. If the percentage is larger than the second threshold, the system can determine that the detected object corresponding to the object bounding box is a false positive object.

For example, the system can obtain the range data in the sensor data of a point that belongs to the bounding box 306 and the range data of the point can be 200 meters. A corresponding pixel, e.g., the pixel 302, in the range map 300 can have a range of 20 meters. The system can determine that at the pixel 302 of the bounding box 306, the difference between the range data in the sensor data, e.g., 200 meters, and the range data of the corresponding location in the range map, e.g., 20 meters, is larger than a threshold, e.g., 25 meters. After computing a large percentage of pixels like this, the system can classify the location corresponding to the bounding box 306 as reflections. The system can determine the detected object 208 corresponding to the bounding box 306 as a false positive object.

As another example, the system can obtain the range data in the sensor data of a point that belongs to the bounding box 310 and the range data of the point can be 200 meters. A corresponding pixel, e.g., the pixel 303, in the range map 300 can have a range of 210 meters. The system can determine that at the pixel 303 of the bounding box 310, the difference between the range data in the sensor data, e.g., 200 meters, and the range data of corresponding location in the range map, e.g., 210 meters, is not larger than a threshold, e.g., 25 meters. After computing a large percentage of pixels like this, the system can determine not to classify the location corresponding to the bounding box 310 as reflections. The system can determine that the detected object corresponding to the bounding box 310 is likely a real object in the environment.

Figure 4:
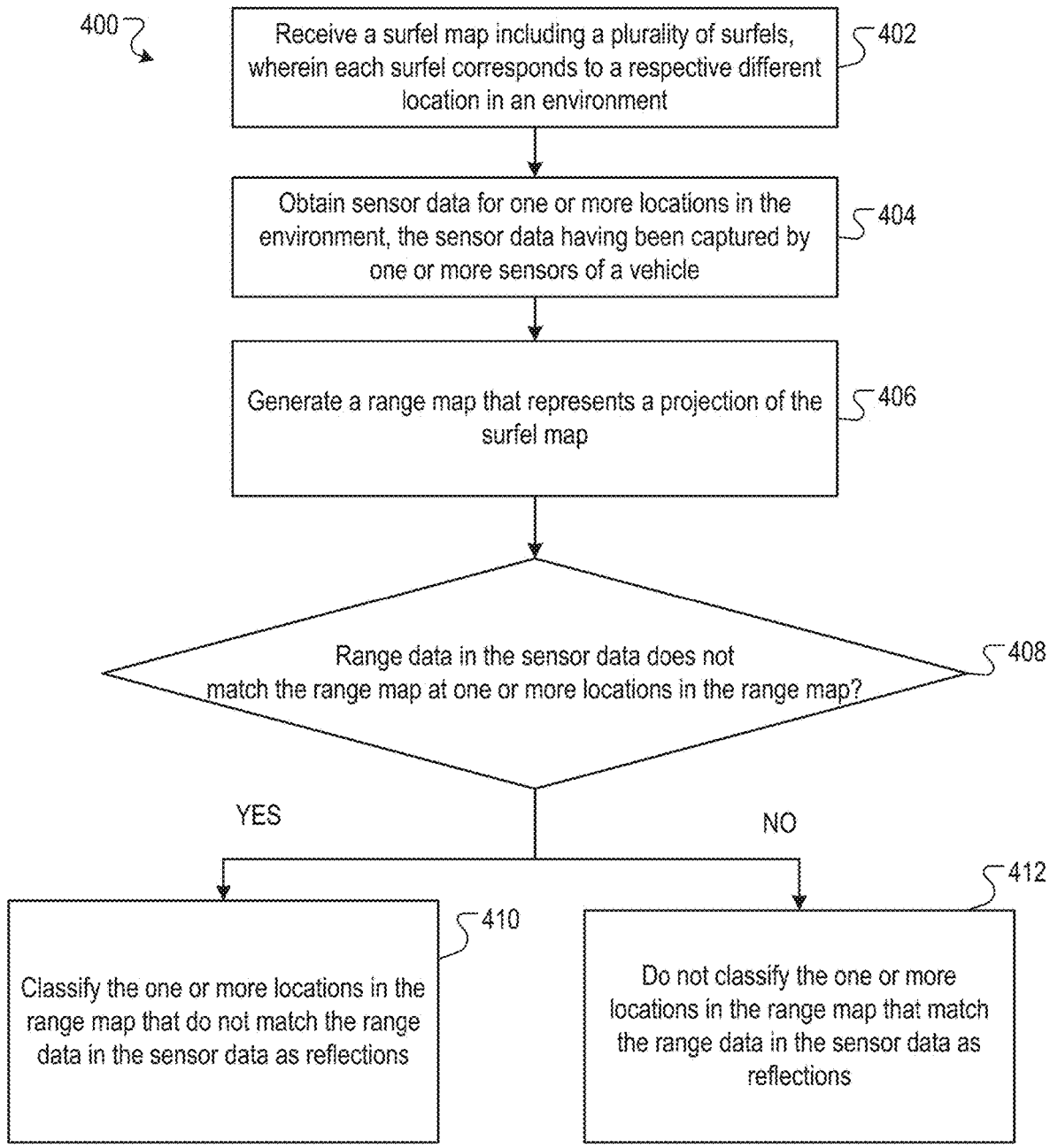
FIG. 4 is a flow diagram of an example process for removing false positive objects using surfel maps.

FIG. 4 is a flow diagram of an example process 400 for removing false positive objects using surfel maps. For convenience, the process 400 will be described as being performed by a system of one or more computers located in one or more locations. For example, an environment prediction system, e.g., the on-board environment prediction system 130 depicted in FIG. 1, appropriately programmed in accordance with this specification, can perform the process 400.

The system receives a surfel map including a plurality of surfels, and each surfel corresponds to a respective different location in an environment (step 402). For example, the system can obtain the surfel map from an on-board surfel map store that stores a previously generated surfel map by one or more vehicles navigating the environment. The surfel map can include surfels for one or more objects in the environment, such as "buildings", "trees", "traffic light", "road signs", etc. In some implementations, each surfel of the plurality of surfels can be associated with a semantic label that represents an object type of a building. Thus, the surfels for a building can be used to remove false positive objects caused by reflections of laser lights that bounce off the windows of the building.

In some implementations, the system can continually receive a portion of a global surfel map that corresponds to the current environment while the autonomous vehicle navigates in the environment. In some implementations, the system can load the surfel map every few frames, instead of for every frame of the sensor data. For example, when an autonomous vehicle is moving fast, the system is less likely to accumulate enough reflection measurements to create a false positive object. Therefore, at each frame of the sensor data, instead of loading the surfel map at the current frame, the system can use the surfel map at the previous frame that has already been loaded, while loading the surfel map for the next frame.

The system obtains sensor data for one or more locations in the environment, and the sensor data have been captured by one or more sensors of a vehicle (step 404). In some implementations, sensor data can include lidar data captured by one or more lidar sensors of the vehicle. The lidar data can include returns of laser lights from objects in the environment. When the environment includes objects with reflective surfaces, e.g., windows of a building, the lidar data can include reflections of laser lights that bounce off the reflective surfaces.

The system generates a range map that represents a projection of the surfel map (step 406). In some implementations, the range map can be an image. For example, the range map can be a two-dimensional image that can be in color or in grayscale.

In some implementations, the range map can be continually generated by a parallel processing hardware. For example, the range map can be continually generated by a computing device that has one or more GPUs. In some implementations, the range map can be continually updated while the vehicle drives in the environment. In some implementations, the range map can be continually updated multiple times per second, e.g., every 0.1 seconds.

The system compares range data in the sensor data to the range map to identify one or more locations in the range map that do not match the range data in the sensor data (step 408). In some implementations, the system can obtain an object mask of an object captured in the sensor data, and the object mask can correspond to range data of the object. The system can project the object mask onto the range map. The system can compare the range data of the object to the range data of the range map at a location indicated by the object mask of the object.

For example, the system can compute a difference between the range of a point cloud of the object and the range of a corresponding location in the range map. The system can compare the difference with a threshold value. If the difference is larger than the threshold value, the system can determine that the range data in the sensor data does not match the range map at the one or more locations in the range map.

In some implementations, the system can compare the range data of the object to range data of the range map at a location indicated by the object mask of the object, and the location in the range map can correspond to a semantic label of a static and non-transparent object in the surfel map. For example, the system can compare the range data of the detected objects to the range data of the range map at a building or a wall in the surfel map. Off-board surfel maps can have semantic labels, such as "buildings", "ground", "trees", etc. The system can obtain surfels for objects that are static and non-transparent by filtering out dynamic objects, ground, and semi-transparent objects such as trees, chain link fences. Because objects behind buildings should not be detected by the sensors, the system can use the range map of the buildings to filter out false positive objects caused by reflections.

For example, as shown in FIG. 2, along the direction of the laser light 206, the range of the detected object 208 is larger than the range of the building 204. The system can determine that the range data of the sensor data for the object 208 does not match the range map at a corresponding location 302 in FIG. 3A because the detected object 208 is occluded by the building 204.

Based on determining that the range data in the sensor data does not match the range map at the one or more locations in the range map, the system classifies the one or more locations in the range map that do not match the range data in the sensor data as reflections (step 410). In some implementations, the system can determine that, at the one or more locations, the range data in the sensor data is further than the range of the range map. In response, the system can classify the one or more locations in the range map as the reflections.

In some implementations, the system can determine that one or more objects detected by the sensor data at the one or more locations that are reflections are false positive objects. The system can filter out or remove the false positive objects caused by reflections bouncing off the reflective surfaces, e.g., large windows of a building. In some implementations, the system can filter out the false positive objects that are located on the road because these false positive objects may create a blockage or a dead zone on the road.

In some implementations, the system can obtain a likelihood score of an object detected in the sensor data at the one or more locations, and the likelihood score can indicate a likelihood that the object is a vehicle type. The system can determine that the likelihood is less than a threshold value, e.g., a threshold value of 50%. In response, the system can determine, based at least in part on classifying the one or more locations as the reflections, that the object detected at the one or more locations is a false positive object caused by the reflections. For example, objects that have a low likelihood of being a vehicle can be determined as false positive objects and can be removed from a list of detected objects. Thus, the objects will not create a blockage or a dead zone that the system needs to avoid or navigate away from. Further, if the system determines that the likelihood is not less than a threshold value, the system can determine that the object detected at the one or more locations is not a false positive object caused by the reflections. For example, objects that have a high likelihood of being a vehicle can be kept as detected objects. Thus, the system is less likely to miss an approaching vehicle during unprotected turns, i.e., turns made at intersections without the aid of a green arrow signal.

In some implementations, the system of a vehicle can share the data indicating the one or more locations as the reflections with other vehicles. The system of the vehicle can update a label for each surfel that corresponds to the one or more locations that are reflections, and the label for each surfel can indicate a high likelihood of reflectivity of the surface. Thus, other vehicles can use the reflectivity information of the surfels to filter out false positive objects that are caused by the reflections.

In some implementations, the system can classify the one or more locations in the range map as reflections based on: (i) the range map does not match the range data in the sensor data, and (ii) other sensor data of the vehicles, e.g., images or videos captured by one or more cameras of sensor subsystem of the vehicle. For example, if the system determines that the range map at a location does not match the range data in the sensor data, and an object detector detects a building at the location in an image captured by a camera, the system can classify the location as reflections.

In some implementations, the system can obtain reflection information at one or more locations determined by two or more vehicles using the surfel map and/or using sensor data of the vehicles, e.g., cameras. Based on the reflections determined by the two or more vehicles, the system can make a final determination of the reflectivity at the one or more locations.

In some implementations, based on determining that the range data in the sensor data matches the range map at the one or more locations in the range map, the system may not classify the one or more locations in the range map that match the range data in the sensor data as reflections (step 412). The system can proceed with a route as previously planned. For example, as shown in FIG. 2, the building 204 may not have large glass windows and the system may not detect the false positive object 208. Thus, the system can determine the range data for detected objects, e.g., the tree 212 and the trash can 216, matches the range map at the one or more locations in the range map. The system may not classify the one or more locations in the range map as reflections.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on its software, firmware, hardware, or a combination of them that in operation cause the system to perform the operations or actions. For one or more computer programs to be configured to perform particular operations or actions means that the one or more programs include instructions that, when executed by a data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:
  receiving a surfel map comprising a plurality of surfels, wherein each surfel corresponds to a respective different location in an environment;
  obtaining sensor data for one or more locations in the environment, the sensor data having been captured by one or more sensors of a vehicle;
  generating a range map that represents a projection of the surfel map;
  comparing range data in the sensor data to the range map to identify one or more locations in the range map that do not match the range data in the sensor data; and
  classifying the one or more locations in the range map that do not match the range data in the sensor data as reflections.

Embodiment 2 is the method of embodiment 1, wherein comparing the range data in the sensor data to the range map to identify the one or more locations in the range map that do not match the range data in the sensor data comprises:
  obtaining an object mask of an object captured in the sensor data, wherein the object mask corresponds to range data of the object;
  projecting the object mask onto the range map; and
  comparing the range data of the object to range data of the range map at a location indicated by the object mask of the object.

Embodiment 3 is the method of any one of embodiments 1 or 2, wherein classifying the one or more locations in the range map that do not match the range data in the sensor data as the reflections comprises:
  determining that, at the one or more locations, the range data in the sensor data is further than the range map; and
  in response, classifying the one or more locations in the range map as the reflections.

Embodiment 4 is the method of any one of embodiments 1-3, wherein the sensor data comprises lidar data captured by one or more lidar sensors of the vehicle.

Embodiment 5 is the method of any one of embodiments 1-4, further comprising:
  obtaining a likelihood score of an object detected in the sensor data at the one or more locations, wherein the likelihood score indicates a likelihood that the object is a vehicle type;
  determining that the likelihood is less than a threshold value; and
  in response, determining, based at least in part on classifying the one or more locations as the reflections, that the object detected at the one or more locations is a false positive object caused by the reflections.

Embodiment 6 is the method of any one of embodiments 1-5, wherein each surfel of the plurality of surfels is associated with a semantic label that represents an object type of a building.

Embodiment 7 is the method of any one of embodiments 1-6, wherein the range map is an image.

Embodiment 8 is the method of any one of embodiments 1-7, wherein the range map is continually updated while the vehicle drives in the environment.

Embodiment 9 is the method of any one of embodiments 1-8, wherein the range map is continually updated multiple times per second.

Embodiment 10 is the method of any one of embodiments 1-9, wherein the range map is continually generated by a parallel processing hardware.

Embodiment 11 is a system comprising: one or more computers and one or more storage devices storing instructions that are operable, when executed by the one or more computers, to cause the one or more computers to perform the method of any one of embodiments 1 to 10.

Embodiment 12 is a computer storage medium encoded with a computer program, the program comprising instructions that are operable, when executed by data processing apparatus, to cause the data processing apparatus to perform the method of any one of embodiments 1 to 10.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
   receiving a surfel map comprising a plurality of surfels, wherein each surfel corresponds to a respective different location on a surface of an object in an environment;
   obtaining sensor data for one or more locations in the environment, the sensor data having been captured by one or more sensors of a vehicle;
   generating a surface range map that represents a projection of the surfel map, wherein each pixel in the surface range map represents a distance from a location on a surface of an object to an observation point in the environment;
   comparing range data in the sensor data to the surface range map generated from the surfel map to identify one or more locations in the surface range map that do not match the range data in the sensor data;
   generating a classification result indicating that the one or more locations in the surface range map that do not match the range data in the sensor data correspond to reflections; and
   providing the classification result indicating that the one or more locations correspond to the reflections to a planning subsystem for making autonomous driving decisions.

2. The method of claim 1, wherein comparing the range data in the sensor data to the surface range map to identify the one or more locations in the surface range map that do not match the range data in the sensor data comprises:
   obtaining an object mask of an object captured in the sensor data, wherein the object mask corresponds to range data of the object;
   projecting the object mask onto the surface range map; and
   comparing the range data of the object to the surface range map at a location indicated by the object mask of the object.

3. The method of claim 1, wherein generating the classification result indicating that the one or more locations in the surface range map that do not match the range data in the sensor data correspond to the reflections comprises:
   determining that, at the one or more locations, the range data in the sensor data is further than the surface range map generated from the surfel map; and
   in response to determining that, at the one or more locations, the range data in the sensor data is further than the surface range map generated from the surfel map, classifying the one or more locations in the surface range map as the reflections.

4. The method of claim 1, wherein the sensor data comprises lidar data captured by one or more lidar sensors of the vehicle.

5. The method of claim 1, further comprising:
   obtaining a likelihood score of an object detected in the sensor data at the one or more locations, wherein the likelihood score indicates a likelihood that the object is a vehicle type;
   determining that the likelihood is less than a threshold value; and
   in response to determining that the likelihood is less than the threshold value, determining, based at least in part on the classification result, that the object detected at the one or more locations is a false positive object caused by the reflections.

6. The method of claim 1, wherein each surfel of the plurality of surfels is associated with a semantic label that represents an object type of a building.

7. The method of claim 1, wherein the surface range map is an image.

8. The method of claim 1, wherein the surface range map is continually updated while the vehicle drives in the environment.

9. The method of claim 1, wherein the surface range map is continually updated multiple times per second.

10. The method of claim 1, wherein the surface range map is continually generated by a parallel processing hardware.

11. A system comprising one or more computers and one or more storage devices storing instructions that are operable, when executed by the one or more computers, to cause the one or more computers to perform operations comprising:
   receiving a surfel map comprising a plurality of surfels, wherein each surfel corresponds to a respective different location on a surface of an object in an environment;
   obtaining sensor data for one or more locations in the environment, the sensor data having been captured by one or more sensors of a vehicle;
   generating a surface range map that represents a projection of the surfel map, wherein each pixel in the surface range map represents a distance from a location on a surface of an object to an observation point in the environment;
   comparing range data in the sensor data to the surface range map generated from the surfel map to identify one or more locations in the surface range map that do not match the range data in the sensor data;

generating a classification result indicating that the one or more locations in the surface range map that do not match the range data in the sensor data correspond to reflections; and providing the classification result indicating that the one or more locations correspond to the reflections to a planning subsystem for making autonomous driving decisions.

12. The system of claim 11, wherein comparing the range data in the sensor data to the surface range map to identify the one or more locations in the surface range map that do not match the range data in the sensor data comprises:

obtaining an object mask of an object captured in the sensor data, wherein the object mask corresponds to range data of the object;

projecting the object mask onto the surface range map; and comparing the range data of the object to the surface range map at a location indicated by the object mask of the object.

13. The system of claim 11, wherein generating the classification result indicating that the one or more locations in the surface range map that do not match the range data in the sensor data correspond to the reflections comprises:

determining that, at the one or more locations, the range data in the sensor data is further than the surface range map generated from the surfel map; and in response to determining that, at the one or more locations, the range data in the sensor data is further than the surface range map generated from the surfel map, classifying the one or more locations in the surface range map as the reflections.

14. The system of claim 11, wherein the sensor data comprises lidar data captured by one or more lidar sensors of the vehicle.

15. The system of claim 11, wherein the operations further comprise:

obtaining a likelihood score of an object detected in the sensor data at the one or more locations, wherein the likelihood score indicates a likelihood that the object is a vehicle type;

determining that the likelihood is less than a threshold value; and in response to determining that the likelihood is less than the threshold value, determining, based at least in part on the classification result, that the object detected at the one or more locations is a false positive object caused by the reflections.

16. The system of claim 11, wherein each surfel of the plurality of surfels is associated with a semantic label that represents an object type of a building.

17. The system of claim 11, wherein the surface range map is an image.

18. The system of claim 11, wherein the surface range map is continually updated while the vehicle drives in the environment.

19. The system of claim 11, wherein the surface range map is continually updated multiple times per second.

20. One or more non-transitory computer storage media encoded with computer program instructions that when executed by a plurality of computers cause the plurality of computers to perform operations comprising:

receiving a surfel map comprising a plurality of surfels, wherein each surfel corresponds to a respective different location on a surface of an object in an environment;

obtaining sensor data for one or more locations in the environment, the sensor data having been captured by one or more sensors of a vehicle;

generating a surface range map that represents a projection of the surfel map, wherein each pixel in the surface range map represents a distance from a location on a surface of an object to an observation point in the environment;

comparing range data in the sensor data to the surface range map generated from the surfel map to identify one or more locations in the surface range map that do not match the range data in the sensor data;

generating a classification result indicating that the one or more locations in the surface range map that do not match the range data in the sensor data correspond to reflections; and providing the classification result indicating that the one or more locations correspond to the reflections to a planning subsystem for making autonomous driving decisions.

* * * * *